United States Patent

[11] 3,557,302

[72] Inventor Norton W. Bell
Pasadena, Calif.

[21] Appl. No. 676,353
[22] Filed Oct. 18, 1967
[45] Patented Jan. 19, 1971
[73] Assignee Bell & Howell Company
Chicago, Ill.
a corporation of Illinois

[54] ONE-CHANNEL SIGNAL CONVEYING SYSTEMS FOR LUMINANCE AND CHROMINANCE VIDEO SIGNALS
13 Claims, 3 Drawing Figs.

[52] U.S. Cl. .......... 178/5.2
[51] Int. Cl. .......... H04n 9/34
[50] Field of Search .......... 179/15A, 15AB, 15AY, 15ST; 178/6TM, 5.45TC, 5.2; 343/200

[56] References Cited

UNITED STATES PATENTS 2,428,118 9/1947 Labin et al. .......... 179/15AY

FOREIGN PATENTS 1,096,409 1/1961 Germany .......... 178/5.4STC

OTHER REFERENCES

Pulse Digital & Switching Circuits by Millman & Taub Section 17-13 Copyright 1965 - McGraw Hill

*Primary Examiner*—Robert L. Griffin
*Assistant Examiner*—Anthony H. Handal
*Attorney*—Raymond A. Andrew

ABSTRACT: An apparatus for conveying a luminance and two chrominance video signals includes a modulator for symmetry-modulating positive and negative half cycles of a carrier wave sequentially by the two chrominance signals and inverted forms of these two chrominance signals, and for varying a further characteristic of the carrier wave to modulate this carrier wave also by the luminance signals.

INVENTOR.
NORTON W. BELL
BY
ATTORNEY.

INVENTOR.
NORTON W. BELL
BY [signature]
ATTORNEY.

INVENTOR.
NORTON W. BELL
BY [signature]
ATTORNEY.

ONE-CHANNEL SIGNAL CONVEYING SYSTEMS FOR LUMINANCE AND CHROMINANCE VIDEO SIGNALS

BACKGROUND OF THE INVENTION

1. Field of the Invention

The invention relates to signal processing systems and, more particularly, to apparatus for conveying a luminance and two chrominance video signals through one channel, such as a signal transmission channel or a recording track.

2. Description of the Prior Art

The desire to convey several simultaneous signals through one channel has received new impetus from the advent of video tape recording machines. While complex studio-type machines have been developed to high perfection, various considerations, notably those of color-subcarrier frequency stability, still present a problem in the development of less complex and less expensive color video tape recorders that are to be within the reach of private individuals, families, and educational institutions, to name some illustrative uses.

Some recent proposals in the latter area proceed on the basis of a line-sequential recording of color video signal components. According to one of these proposals, only the combined luminance and synchronization signals of a composite color video signal are recorded continuously, while the two chrominance signals, which in the NTSC system are the I and Q or the R−Y AND B−Y signals, are recorded in an alternating sequence.

It has been found that this recording procedure still leads to high-quality color pictures, since the human eye is generally less sensitive to color details and variations than to luminosity changes.

SUMMARY OF THE INVENTION

The present invention resides in apparatus for conveying color video signals including a luminance signal and two chroma signals through one channel, comprising (a) first means for providing an electric carrier wave having positive and negative half-cycles, (b) second means for providing recurring chroma signal sequences including said two chroma signals and inverted forms of said two chroma signals, (c) third means connected to said first and said second means for modulating said carrier wave by said recurring chroma signal sequences by varying the relative symmetry between positive and negative half-cycles of said carrier wave, (d) fourth means for modulating said carrier wave by said luminance signal by varying at least one other characteristic of said carrier wave, and (e) fifth means connected to said third and fourth means for applying said modulated carrier wave to said channel.

BRIEF DESCRIPTION OF THE DRAWINGS

The above mentioned as well as further features of the subject invention are illustrated by way of example in the accompanying drawings, in which.

DESCRIPTION OF THE PREFERRED EMBODIMENTS

Figure 1:
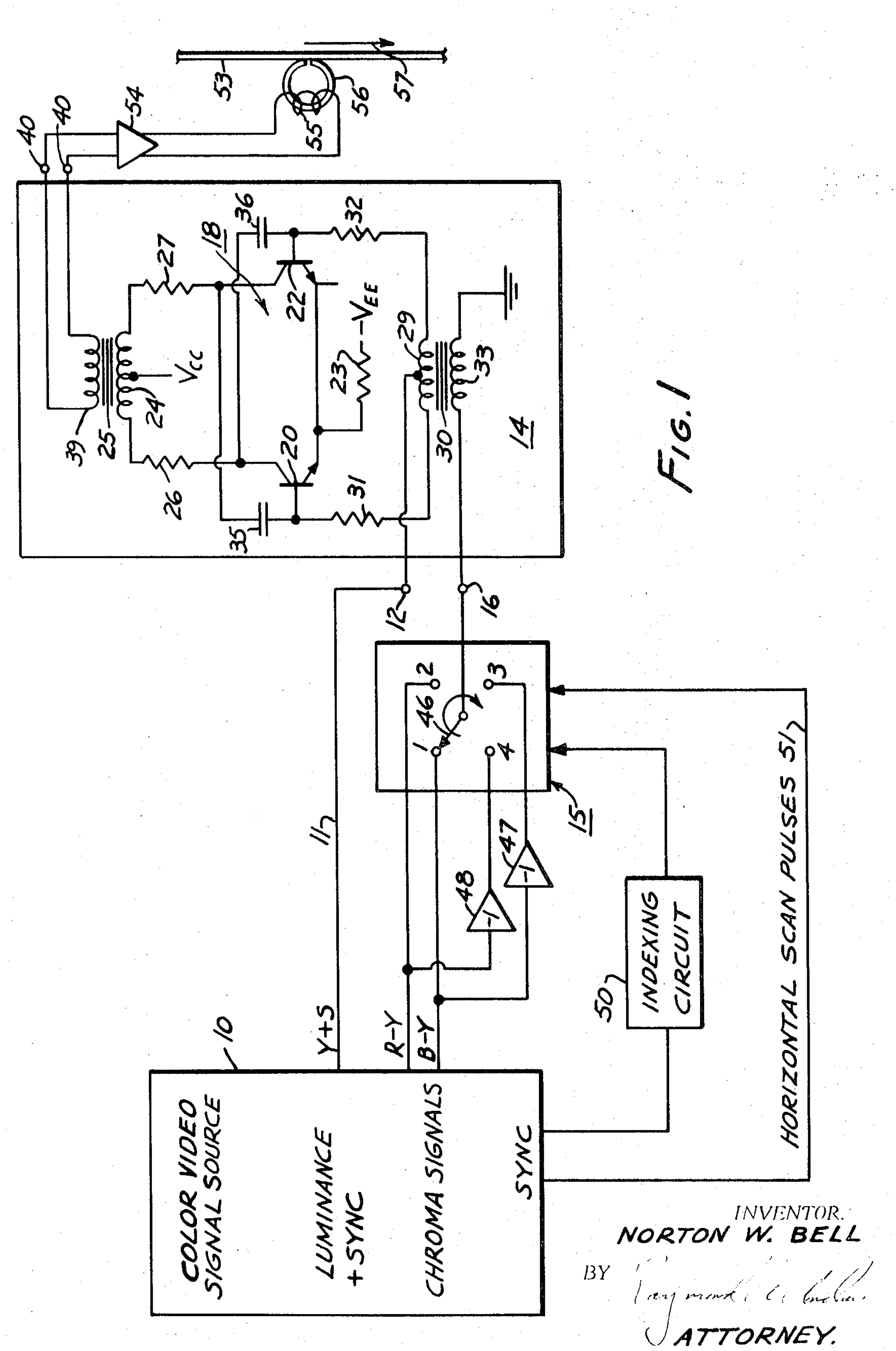
FIG. 1 is a diagram of a signal modulating and switching apparatus according to a preferred embodiment of the invention.
Figure 2:
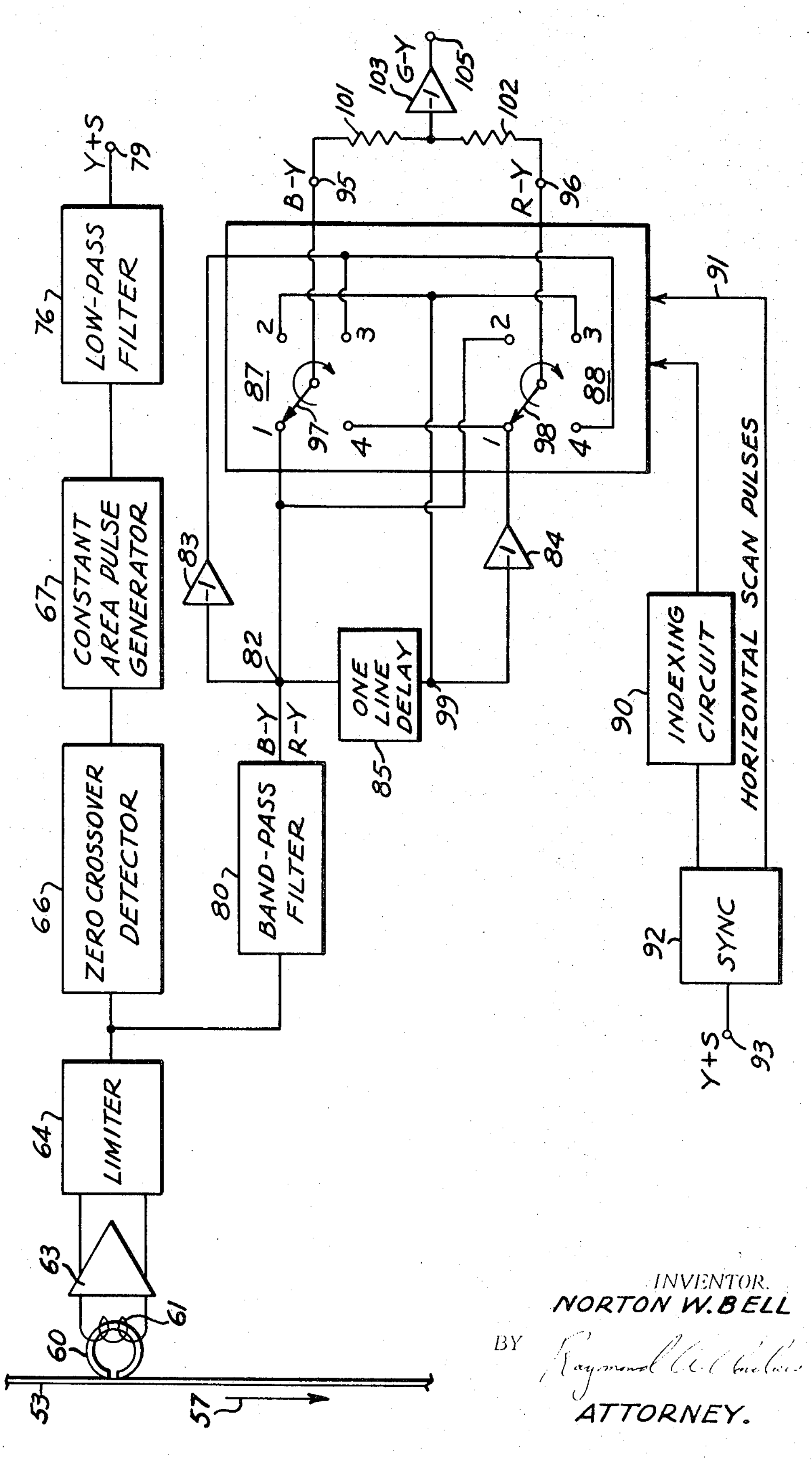
FIG. 2 is a diagram of a signal demodulating and switching apparatus according to a further preferred embodiment of the invention.

The signal modulating and switching apparatus illustrated in FIG. 1 is particularly suitable for preparing color video signals for recording on magnetic tape, while the signal demodulating and switching apparatus shown in FIG. 2 is particularly suitable for preparing color video signals played back from a magnetic tape for display in a color video receiver. Accordingly, the apparatus of FIGS. 1 and 2 may be considered as part of a color video recording-playback system.

While the subject invention is obviously not limited in this manner, it is explained in the illustrated embodiments by reference to certain signals which occur in NTSC-standard color video or television systems. These signals include the well-known Y+S (luminance and sync) signal and the two familiar chrominance signals R−Y (red minus luminance) and B−Y (blue minus luminance). As far as the latter two signals are concerned, it is understood that the well-known I and Q (in-phase and quadrature) chroma signals may be used in place of the R−Y and B−Y signals.

The apparatus of FIG. 1 has been illustrated as comprising a color video signal source 10 which provides the above mentioned Y+S, R−Y and B−Y signals, as well as horizontal and vertical scan pulses. All these signals are provided by conventional color television receiver circuits, so that the source 10 may be a color television receiver (see Fink, Television Engineering Handbook (McGraw-Hill 1957), FIG. 16—252). This receiver may be considered as receiving a color television program that is to be recorded.

The Y+S signals from the source 10 are applied by way of a lead 11 to a first input 12 of a period and symmetry modulator 14. The chrominance signals R−Y AND B−Y are applied by means of a sequencing and polarity reversal switch arrangement 15 to a second input 16 of the modulator 14.

In the illustrated embodiment, the modulator 14 comprises a free-running or a stable multivibrator 18 including a pair of transistors 20 and 22 having their emitters negatively biased through a resistor 23 and their collectors positively biased through the center-tapped primary winding 24 of a transformer 25 and resistors 26 and 27 as shown. The input terminal 12 is connected to the bases of the transistors 20 and 22 through the center-tapped secondary winding 29 of a transformer 30 and through resistors 31 and 32, while the primary winding 33 of the transformer 30 is connected between the input terminal 16 and ground. Moreover, a first capacitor 35 is inserted between the base of the transistor 20 and the collector of the transistor 22, while a second capacitor 36 is connected between the base of the transistor 22 and the collector of the transistor 20.

Figure 3:
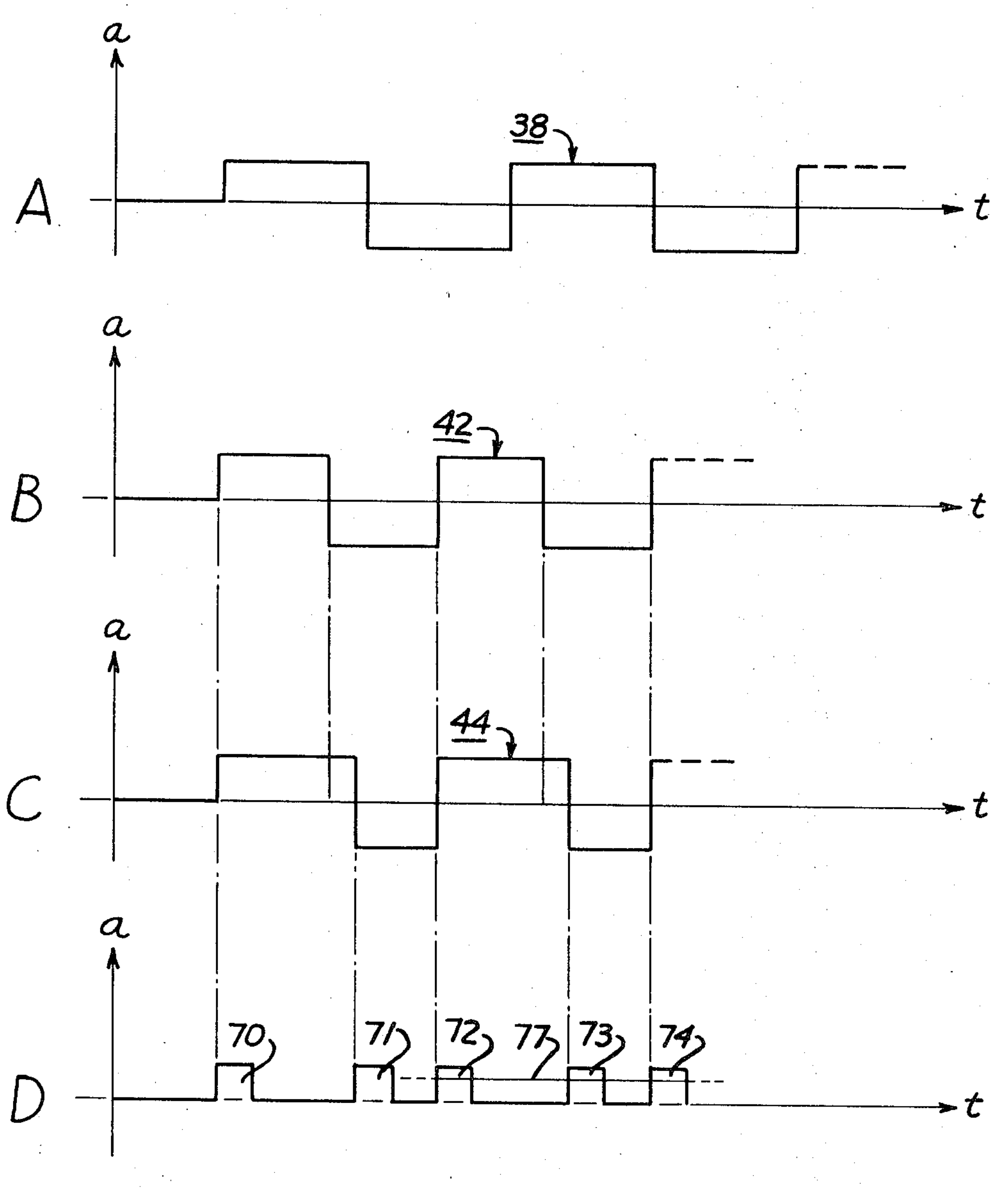
FIGS. 3A to D are curves illustrating phases of the operation of the apparatus of FIGS. 1 and 2.

In accordance with the well-known operation of free-running or astable multivibrators (see Millman & Taub, Pulse and Digital Circuits (McGraw-Hill 1956) pp. 599 to 603, and particularly p. 602 and Fig. 18—38), the timing capacitors 35 and 36 are alternatively charged and discharged and the transistors 20 and 22 alternatively rendered conducting and nonconducting so that a waveform of the type shown at 38 in FIG. 3A appears across the secondary winding 39 of the transformer 25 and thus at the output terminals 40 of the modulator 14.

For present purposes, the waveform 38 is considered as representing an unmodulated carrier for conveying the signals applied to the input 12 as well as the signals applied to the input 16 through a single transmission or recording channel.

The signals applied to the input 12 operate through the center-tapped primary winding 29 and affect both transistors 20 and 22 in a like manner. More particularly, signals applied to the input 12, depending on their polarity, either shorten or lengthen the cutoff time of both transistors 20 and 22.

In this manner, the period of frequency of the waveform 38 is modulated by signals applied to the modulator input 14.

The waveform 42 in FIG. 3B qualitatively illustrates an example of this kind of period or frequency modulation. It will be noted that the symmetry of the positive and negative half-cycles of the waveform 42 is not affected by the type of time modulation just discussed.

On the other hand, signals applied to the input terminal 16 bias the bases of the transistors 20 and 22 in opposite senses in that they increase the bias at the base of one transistor while decreasing the bias at the base of the other transistor. In this manner, the cutoff time of one of the transistors is shortened, while the cutoff time of the other transistor is correspondingly lengthened. This does not change the period or frequency of the waveform 38, but it does alter the symmetry between the positive and negative half-cycles of that waveform.

Accordingly, the carrier 38 is time modulated by signals applied to the input 12 and symmetry modulated by signals applied to the input 16. An example of a time and symmetry modulated waveform is shown at 44 in FIG. 3C.

It will now be recognized that the modulator 14 is capable of conveying the Y+S and the R—Y and B—Y chroma signals through a single transmission or recording channel, if the R—Y and B—Y signals are, for the reasons discussed above, applied alternatively to the modulator input 16, such as by means of electronic switching apparatus.

In accordance with the subject invention the apparatus according to the preferred embodiment illustrated in FIG. 1 combines the modulation action just discussed with a continuous polarity-switching process applied to the R—Y and B—Y chroma signals. In general terms, this polarity-switching process provides recurring chroma signal sequences including the two chroma signals and inverted forms of the two chroma signals. To illustrate this principle, the switch 15 is symbolically shown as having a rotary switch arm 46 which successively engages stationary contacts 1, 2, 3 and 4.

The contact 1 is connected to the B—Y output of the source 10 and the contact 2 to the R—Y output of that source. The contact 3 is connected to the B—Y output through an inverting amplifier 47 of a gain of minus one, while the contact 4 is connected to the R—Y output of the source 10 through an inverting amplifier 48, also of a gain of minus one. The switch arm 46 is connected to the input terminal 16 of the modulator 14 whereby chroma signals of the values B—Y, R—Y, Y—B, Y—R, are sequentially applied to the modulator input 16 as the switch arm 46 rotates over the contacts 1, 2, 3 and 4.

In accordance with a preferred embodiment, the switch arm 46 is set to start out from one of the contacts, say contact 1, at the beginning of an image field, and is then driven from contact to contact at the horizontal scan pulse rate. An indexing circuit 50 driven by sync pulses from the source 10 is shown in FIG. 1 as a means for timing the field rate sequence of the switch arm 46, while a line 51 extending between the source 10 and the switch 15 represents a means for sequencing the switch arm 46 from contact to contact by the use of horizontal scan pulses.

An indexing or field recognition apparatus which is suitable as the indexing circuit 50 is disclosed in my copending U.S. Pat. application Ser. No. 656,574, entitled "Information Indexing Apparatus," filed July 27, 1967, and assigned to the subject assignee. That indexing apparatus is responsive to vertical and horizontal sync pulses and provides field or frame recognition pulses that can be used for the sequencing of electronic switches.

Electronic switches of the type symbolized at 15 in FIG. 1 and means for sequencing such switches are known per se. Particularly suitable switching devices for such a switch have been disclosed and are shown in FIGS. 1, 2 and 5 of the copending U.S. Pat. Application Ser. No. 656,578, entitled "Electronic Signal Processing Apparatus," filed July 27, 1967, by Bert H. Dann, and assigned to the subject assignee. Reference may also be had to the copending U.S. Pat. application Ser. No. 656,573, entitled "Electronic Signal Processing Systems," filed July 27, 1967, by Norton W. Bell and Bert H. Dann, and assigned to the subject assignee.

The polarity reversal action carried out by the switch 15 with the aid of the inverters 47 and 48 is a very important feature of subject invention. This will become apparent from the fact that both color-difference signals R—Y and B—Y have low frequency components which extend to the direct-current region. If these chroma signals were applied to the modulator 14 without the above mentioned polarity reversal operation, their low frequency components would appear in the symmetry-modulated carrier wave appearing at the output terminals 40. In consequence, the single transmission or recording channel to which the modulated carrier wave is applied would have to handle low frequency components extending to the direct-current region. In practice, such bandwidth facilities are not available in transmission or recording channels, so that significant portions of the chroma information would be lost.

These disadvantages are avoided in the illustrated embodiment by the polarity-reversal operation effected by the switch 15 and the inverters 47 and 48 on the color-difference signals R—Y and B—Y. This polarity-reversal operation removes low frequency components from the modulated carrier wave appearing at the modulator output terminals 40. In processing video signals produced under NTSC color standards, the polarity-reversal operation illustrated in FIG. 1 removes from the modulated carrier wave all frequency components below the horizontal scan rate of 15.734 kHz. so that transmission or recording equipment of a conventional bandwidth may be employed for transmitting or recording the time and symmetry modulated carrier wave.

In the embodiment illustrated in FIG. 1, the time and symmetry modulated carrier wave appearing at the modulator output terminals 40 is recorded on a magnetic tape 53 in a single recording channel. To this end, the modulated carrier wave is amplified in a recording amplifier 54 connected to the output terminals 40 and is thereupon applied to the winding 55 of a magnetic recording head 56 which is in operative engagement with the tape 53. During recording, the tape 53 is advanced in the direction of arrow 57 by conventional tape drive equipment. The recording head 56 may, in accordance with conventional practice, be mounted on a head disc (not shown) which is driven by conventional equipment to record the modulated carrier wave in a slant track or transverse scan pattern on the magnetic tape 53.

If the latter well-known technique is used, a plurality of parallel recording tracks will appear on the magnetic tape. However, these tracks still constitute a single recording channel. A wireless or cable transmission link may be substituted for the recording head 56 and the magnetic tape 53 if it is desired to transmit, rather than to record, the modulated carrier wave.

FIG. 2 shows apparatus for recovering the Y+S, R—Y and B—Y signals from the time and symmetry modulated carrier wave produced by the apparatus of FIG. 1 or by equivalent equipment. While the apparatus shown in FIG. 2 is suitable for processing a time and symmetry modulated carrier wave received through a wireless or cable transmission channel, it has been illustrated as a means for processing such modulated carrier wave upon the playback of the record thereof on the magnetic tape 53.

Accordingly, the tape 53 carrying the modulated carrier wave as recorded by the equipment illustrated in FIG. 1 is shown in FIG. 2 as being engaged by a magnetic playback head 60 having a winding 61 for reproducing the recorded modulated carrier wave. The tape 53 is again driven in the direction of arrow 57 and conventional equipment may be employed for playing back the recorded information.

The reproduced modulated carrier wave is amplified by an amplifier 63 connected to the winding 61 and is thereupon passed through a limiter 64 which suppresses amplitude variations in the modulated carrier wave.

For the purpose of explanation, it is assumed that the limited modulated carrier wave corresponds to the waveform 44 shown in FIG. 3C. This waveform is applied to a combination of a zero crossover detector 66 and a constant area pulse generator 67. The detector 66 is connected to the output of the limiter 64 and provides a signal in response to every zero crossing of the waveform 44. The generator 67 is connected to the output of the detector 66 and provides a constant-area pulse in response to every zero crossover signal produced by the detector 66. A series of constant-area pulses 70 to 74 produced by the generator 67 in conformity to the zero crossovers of the waveform 44 is shown in FIG. 3D.

The constant-area pulses produced by the generator 67 are applied to a low-pass filter 76 which provides an output signal, schematically shown at 77 in FIG. 3D, that varies as a function of the spacing between the pulses 70 and 72, and 72 and 74 which represent the length of the periods of the waveform 44 illustrated in FIG. 3C. The low-pass filter 76 has a cutoff frequency dimensioned to render its output signal 77 insensitive to variations in the spacing of the pulse 71 relative to the pulses 70 and 72, and of the pulse 73 relative to the pulses 72 and 74.

If no symmetry modulation were present, it would be sufficient to provide the filter 76 with a characteristic that would suppress the second harmonic of the modulated carrier wave, since the zero crossovers of each period are equally spaced in the absence of symmetry modulation. In the case of symmetry modulation, lower frequency components than this second harmonic are introduced into the modulated carrier signal, since symmetry modulation shifts the zero crossover time between alternate half-cycles of a period relative to the beginning and end of that period. This is seen in FIG. 3D where the pulse 71, for instance, is farther removed from the pulse 70 than from the pulse 72.

Accordingly, the minimum frequency of the carrier wave 38, FIG. 3A, has to be increased, or the cutoff frequency of the low-pass filter 76 has to be decreased, or both of these measures have to be taken if symmetry modulation is employed. For practical combined period or frequency and symmetry modulation systems, a low-pass filter 76 which starts its attenuation action at about the maximum frequency of the Y+S signal is preferred.

It will now be recognized that the apparatus of FIG. 2 provides at its output terminal 79 the reproduced Y+S signal free of color information.

For the reproduction of the color-difference signals R−Y and B−Y, a band-pass filter 80 is connected to the output of the limiter 64. Because of the above-mentioned polarity reversal operation carried out in the apparatus of FIG. 1, the band-pass filter 80 may have a lower cutoff frequency of about 15 kHz. under the NTSC video standard. The upper cutoff frequency of the filter 80 may be at about 500 kHz. under the NTSC standard, since most color information will then be passed by the filter 80.

The limiter 64 and the band-pass filter 80 cooperate in reconstructing the color-difference signals. In the absence of symmetry modulation, the area of the positive half-cycle of a period of the modulated carrier wave is equal to the area of the negative half-cycle of that period. As its name implies, this symmetrical relationship is changed by symmetry modulation as may be seen in the waveform 44 of FIG. 3C which may be viewed as the output signal of the limiter 64.

The band-pass filter 80 averages the output signal of the limiter 64. If the area of each positive half-cycle in the output signal of the limiter 64 is equal to the area of each negative half-cycle no net output signal will result at the output terminal 82 of the filter 80. However, net output signals will result if the area of the positive half-cycles is larger or smaller than the area of the negative half-cycles.

These net output signals contain the color-difference information R−Y and B−Y, since that is the information which is applied to the input 16 of the modulator 14 of FIG. 1 in order to symmetry-modulate the carrier wave. The color information thus reproduced at the terminal 82 in FIG. 2 is substantially free of Y+S information, since a frequency or period modulation does not as such change the symmetry of the positive and negative half-cycles of the carrier wave.

The signal processing and switching equipment shown in FIG. 2 as connected to the output terminal 82 of the band-pass filter 80 basically performs two functions. It annuls the polarity-reversal operation carried out in the apparatus of FIG. 1, and it provides for the simultaneous presence of the sequentially recorded or transmitted color-difference signals R−Y and B−Y.

To annul the polarity-reversal operation of the inverters 47 and 48 shown in FIG. 1, the apparatus of FIG. 2 has two similar inverting amplifiers 83 and 84 connected to the terminal 82. To provide for the simultaneous presence of the color-difference signals, a delay line 85 is connected to the terminal 82. The line 85 may be a conventional delay line which delays a signal applied thereto by the duration of a horizontal video image line.

The apparatus of FIG. 2 further includes a pair of switches 87 and 88, each of which is a duplicate of the switch 15 shown in FIG. 1 and described in connection therewith. The switches 87 and 88 are set and stepped by an indexing circuit 90 which is a duplicate of the indexing circuit 50 shown in FIG. 1 and by horizontal scan pulses which are applied through a line 91 which is the equivalent of the line 51 shown in FIG. 1.

To insure synchronism of the switches 87 and 88 relative to the switch 15, the circuit 90 and the line 91 are connected to a sync separator apparatus 92 which may be of a conventional type and which extracts from a Y+S signal applied to an input terminal 93 horizontal scan pulses for the line 91 and vertical and horizontal scan pulses for driving the indexing circuit 90.

The input terminal 93 may be connected to the output of the low-pass filter 76. If desired, a delay network (not shown) may be inserted between the output of the low-pass filter 76 and the output terminal 79 to compensate for delays introduced by the components 90 and 92, so that the Y+S signal will appear at the terminal 79 in a time-correct relationship to the B−Y and R−Y signals at the output terminals 95 and 96.

The switches 87 and 88 have been symbolically shown as having switch arms 97 and 98 which rotate in synchronism with the symbolic switch arm 46 of the switch 15 illustrated in FIG. 1.

The color-difference signals appear at the terminal 82 in the sequence of B−Y, R−Y, −(B−Y), and −(R−Y), this sequence being provided by the switch 15 in FIG. 1. Owing to the presence of the delay line 85, color-difference signals in the sequence of −(R−Y), B−Y, R−Y, and −(B−Y) appear at the terminal 99. With the contacts 1 through 4 of the switch 87 and the contacts 1 through 4 of the switch 88 connected as shown, the color-difference signals B−Y and the color-difference signals R−Y appear simultaneously at the output terminals 95 and 96, respectively.

In practice the switches 87 and 88 are of an electronic type, as has already been pointed out above in connection with the switch 15 of the apparatus of FIG. 1. The limiter 64 may be of a conventional type having several limiter stages. A suitable limiter circuit has been described in Wilcox, Problems Encountered in Wide-Band Frequency Modulation, Proc. Ntl. Electronics Conf., Vol. 15 (1959), pp. 173—81. Zero crossover detectors and constant-area pulse generators are also well known in the electronics art.

The Y+S, B−Y and R−Y signals appearing at the output terminals 79, 95 and 96 are suitable for processing in conventional color television receiver circuits which are designed to respond to these signals for the display of color television programs with tricolor picture tubes. By way of example, FIG. 2 shows two matrixing resistors 101 and 102 connected in series across the terminals 95 and 96, and an inverter 103 connected to the junction between the resistors 101 and 102 for providing a G−Y (green minus luminance) color-difference signal at an output terminal 105.

It will now be recognized that the apparatus and system disclosed herein permit the recording of color television programs in one single recording channel, thereby making very efficient use of the available recording channel bandwidth and avoiding unequal delay and other problems encountered in systems in which the color information is recorded separately from the monochromatic information. It will also be recognized that the high noise immunity and the efficient bandwidth utilization render the system disclosed herein advantageous in the transmission of color television programs over a single cable or wireless transmission channel.

While specific embodiments have been disclosed herein, various modifications within the spirit and scope of the subject invention will be apparent or suggest themselves to those skilled in the art.

I claim:

1. Apparatus for conveying color video signals including a luminance signal and two chroma signals through one channel, comprising:

a. first means for providing an electric carrier wave having positive and negative half-cycles;

b. second means for providing recurring chroma signal sequences including said two chroma signals and inverted forms of said two chroma signals;
c. third means connected to said first and said second means for modulating said carrier wave by said recurring chroma signal sequences by varying the relative symmetry between positive and negative half-cycles of said carrier wave;
d. fourth means for modulating said carrier wave by said luminance signal by varying at least one other characteristic of said carrier wave; and
e. fifth means connected to said third and fourth means for applying said modulated carrier wave to said channel.

2. Apparatus as claimed in claim 1, wherein said second means includes switching means for periodically reversing the polarity of said two chroma signals.

3. Apparatus as claimed in claim 1, wherein said channel is a magnetic recording track, and wherein said means for applying said modulated carrier wave to said channel include a magnetic recording head for recording said modulated carrier wave in said recording track.

4. Apparatus as claimed in claim 1, including:
a. fifth means for deriving said modulated carrier wave from said channel;
b. sixth means connected to said fifth means for:
 1. alternatively reproducing said recurring chroma signal sequences in response to variations of said symmetry of said carrier wave; and
 2. reproducing said luminance signal in response to variations of said other characteristic of said carrier wave; and
c. seventh means connected to said sixth means for deriving said two chroma signals from said reproduced recurring chroma signal sequences and providing said derived chroma signals simultaneously.

5. Apparatus as claimed in claim 4, wherein said seventh means include means for delaying chroma signals by a predetermined amount of time.

6. Apparatus for conveying color video signals including a luminance signal and two chroma signals through one channel, comprising:
a. modulator means including:
 first means for providing an electric carrier wave having alternating positive and negative half-cycles;
 second means for modulating said carrier wave by varying the relative symmetry between positive and negative half-cycles of said carrier wave; and
 third means for modulating said carrier wave by varying at least one other characteristic of said carrier wave;
b. switching means connected to said second means for sequentially applying said chroma signals and inverted forms of said chroma signals to said second means for the symmetry modulation of said carrier wave by said chroma signals and by said inverted chroma signals; and
c. means connected to said third means for applying said luminance signal to said third means for the further modulation of said carrier wave.

7. Apparatus as claimed in claim 6, including means connected to said switching means for inverting said chroma signals and for applying said inverted chroma signals to said switching means.

8. Apparatus as claimed in claim 6, including:
a. means for receiving said modulated carrier wave;
b. first demodulator means connected to said receiving means for reconstructing said luminance signal from said modulated carrier wave;
c. second demodulator means connected to said receiving means for reconstructing said chroma signals and said inverted chroma signals from said modulated carrier wave;
d. delay means connected to said second demodulator means for delaying said reconstructed chroma signals and said inverted chroma signals;
e. inverter means connected to said second demodulator means and to said delay means for annulling the inversion of said reconstructed inverted chroma signals and of said delayed inverted chroma signals; and
f. synchronous switching means connected to said second demodulator means, to said delay means and to said inverter means for simultaneously presenting the first-mentioned two chroma signals.

9. Apparatus as claimed in claim 8, wherein said first demodulator means include:
a. means connected to said receiving means for detecting zero crossovers in said modulated carrier wave and for generating a pulse for each detected zero crossover; and
b. means connected to receive said generated pulses for reconstructing said luminance signal from said generated pulses.

10. Apparatus as claimed in claim 9, wherein said means for reconstructing said luminance signal from said generated pulses include low-pass filter means dimensioned to attenuate frequencies above the maximum frequency of said luminance signal.

11. Apparatus as claimed in claim 8, wherein said second demodulator means include:
a. limiter means connected to said receiving means for limiting the amplitude of said modulated carrier wave; and
b. means connected to said limiter means for averaging positive and negative half-cycles of said amplitude-limited carrier wave.

12. Apparatus as claimed in claim 11, wherein said averaging means include band-pass filter means.

13. Apparatus for demodulating a carrier wave having cycles time-modulated by a luminance signal and having half-cycles symmetry-modulated by chrominance signals of a color video signal, with said chrominance signals including recurring sequences of a first and a second chroma signal and inverted forms of said first and second chroma signals, comprising:
a. limiter means for receiving said modulated carrier wave and for limiting the amplitude of said modulated carrier wave;
b. means connected to said limiter means for averaging positive and negative half-cycles of said amplitude-limited carrier wave to retrieve said recurring chroma signal sequences from said symmetry-modulated half-cycles;
c. means connected to said averaging means for deriving said first and second chroma signals from said retrieved recurring chroma signal sequences;
d. means connected to said limiter means for detecting zero crossovers in said modulated carrier wave and for generating constant-area pulses in response to said detected zero crossovers; and
e. low-pass filter means connected to receive said constant-area pulses for retrieving said luminance signal contained in said time-modulated cycles of the carrier wave.